United States Patent
Hull et al.

(10) Patent No.: US 11,498,673 B2
(45) Date of Patent: Nov. 15, 2022

(54) LIGHT COMMUNICATION SLIP RING

(71) Applicant: Bell Textron Inc., Fort Worth, TX (US)

(72) Inventors: Michael Raymond Hull, Fort Worth, TX (US); Daniel Duane Donley, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 524 days.

(21) Appl. No.: 16/584,240

(22) Filed: Sep. 26, 2019

(65) Prior Publication Data
US 2021/0094684 A1 Apr. 1, 2021

(51) Int. Cl.
| | |
|---|---|
| *B64C 27/72* | (2006.01) |
| *H04B 10/116* | (2013.01) |
| *B64C 27/32* | (2006.01) |
| *H04B 10/80* | (2013.01) |
| *B64C 27/82* | (2006.01) |

(52) U.S. Cl.
CPC .............. *B64C 27/72* (2013.01); *B64C 27/32* (2013.01); *H04B 10/116* (2013.01); *H04B 10/803* (2013.01); *H04B 10/807* (2013.01); *B64C 2027/8209* (2013.01); *B64C 2201/024* (2013.01)

(58) Field of Classification Search
CPC . B64C 27/72; B64C 27/32; B64C 2027/8209; B64C 2201/024; H04B 10/116; H04B 10/803; H04B 10/807
USPC ........................................................ 356/400
See application file for complete search history.

(56) References Cited

U.S. PATENT DOCUMENTS

| | | | |
|---|---|---|---|
| 4,275,992 A | 6/1981 | Andrews et al. | |
| 4,379,678 A | 4/1983 | Carlock et al. | |
| 4,802,861 A | 2/1989 | Gaston | |
| 7,430,223 B2* | 9/2008 | Smith | G06F 1/1683 |
| | | | 370/535 |
| 8,132,474 B2 | 3/2012 | Jackson | |
| 9,411,382 B2* | 8/2016 | Atkinson | G06F 1/162 |
| 9,452,828 B2 | 9/2016 | Heveriy et al. | |
| 9,623,964 B2 | 4/2017 | Baskin et al. | |
| 10,833,763 B2* | 11/2020 | Kang | H04B 10/1125 |
| 2008/0317406 A1* | 12/2008 | Santori | H04B 10/803 |
| | | | 385/24 |
| 2014/0286772 A1 | 9/2014 | Popelka et al. | |
| 2016/0091924 A1* | 3/2016 | Aoki | F16M 11/2007 |
| | | | 361/679.28 |
| 2018/0050796 A1* | 2/2018 | Wittmaak | B60L 7/02 |
| 2018/0067006 A1 | 3/2018 | Ehinger et al. | |
| 2018/0370621 A1 | 12/2018 | Heveriy, II et al. | |
| 2021/0274068 A1* | 9/2021 | Masarik | H04B 10/803 |

* cited by examiner

*Primary Examiner* — Dalzid E Singh
(74) *Attorney, Agent, or Firm* — Fogarty LLP (57) ABSTRACT

Embodiments are directed to a rotor system for an aircraft comprising a gearbox configured to receive torque from a drive train, a mast having a first end and a second end, wherein the first end is attached to the gearbox and the mast configured to rotate in response to the torque from the drive train, a rotor hub attached to the second end of the mast, a first light transceiver mounted adjacent to the first end of the mast, wherein the first light transceiver is does not rotate relative to the mast, and a second light transceiver mounted adjacent to the second end of the mast, wherein the second light transceiver rotates with the mast.

18 Claims, 8 Drawing Sheets

LIGHT COMMUNICATION SLIP RING

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades and a power source, such as an engine and transmission, to drive the rotor system. The engine and transmission may be coupled by a drive shaft.

Sensors and other electrical components may be used to monitor and control aspects of the rotor system. Such sensors and other components rotate with the rotor system. Electrical signals from sensors and other components on the rotor system are often exchanged with equipment located in the non-rotating sections of the rotorcraft, such as in an engine nacelle or in a fuselage avionics compartment. Direct wire connections cannot be used to connect the rotating sensors with the fixed equipment since such wire connections would be quickly break due to twisting caused by the sensor's rotation. Existing rotorcraft use slip rings to provide an interface between the rotating and non-rotating equipment. Slip rings use brushes to maintain an electrical connection between fixed and rotating components, such brushes require frequent maintenance and have low reliability characteristics.

SUMMARY

In one aspect, embodiments are directed to a light communication slip ring, which is a dual receiver/transmitter system that transmits power and data from a fixed section of an aircraft to a rotating section using light. The signals may be transmitted in a visible and/or invisible spectrum as a narrow beam or as a laser. The data may be split into multiple channels. A converter and distributor may be included in the system to interface with other aircraft systems.

Embodiments are directed to a method and system for providing light communication in an apparatus having a rotating component. The system may comprise a first light communication access point attached to, and configured to rotate with, the rotating component, and a second light communication access point attached to a fixed component, wherein the second light communication access point is configured to remain stationary relative to rotation of the first light communication access point, and wherein the first and second light communication access points are configured to exchange light signals during rotation of the rotating component. The rotating component may be, for example, an aircraft rotor system, and the fixed component may be a gearbox structure. Light communication may be established in the system using a visible light spectrum, an invisible light spectrum, or both.

The system may further comprise a mast having a first end and a second end. The mast has a hollow center portion extending between the first end and the second end. The first light communication access point is positioned near the first end of the mast, the second light communication access point is positioned near the second end of the mast, and the light signals are transmitted through the hollow center portion of the mast.

The system may further comprise a mast having a hollow center portion, and a standpipe positioned coaxially within the hollow center portion of the mast. The standpipe has a first end and a second end, and a hollow center portion extending between the first end and the second end. The first light communication access point is positioned adjacent the first end of the standpipe, the second light communication access point is positioned adjacent the second end of the standpipe, and the light signals are transmitted through the hollow center portion of the standpipe. The mast may be attached to and drive the rotating component, and the standpipe may be attached to the fixed component.

The first and second light communication access points may comprise a light transmitter configured to transmit light signals and a light receiver configured to receive light signals. The light transmitter may be a Light Emitting Diode (LED). The light transmitter may further comprise an encoder that encodes data onto the light signals. The light receiver may be a photodetector. The light receiver may further comprise a decoder that extracts data from the light signals.

In another embodiment, a rotor system for an aircraft comprises a gearbox configured to receive torque from a drive train, a mast having a first end and a second end, wherein the first end is attached to the gearbox and the mast configured to rotate in response to the torque from the drive train, a rotor hub attached to the second end of the mast, a first light transceiver mounted adjacent to the first end of the mast, wherein the first light transceiver is does not rotate relative to the mast, and a second light transceiver mounted adjacent to the second end of the mast, wherein the second light transceiver rotates with the mast.

The first and second light transceivers may each comprise a light transmitter configured to transmit light signals, and a light receiver configured to receive light signals. The the first and second light transceivers may be configured to exchange light signals carrying encoded data.

The first light transceivers may be configured to transmit light power signal, and the second light transceiver may be configured to receive the light power signal. The second light transceiver may be further configured to convert the light power signals to electrical energy for use in powering electrical components mounted on the rotor hub.

In a further embodiment, a method comprises receiving an electronic signal at a first light transceiver, encoding data from the electronic signal onto a light signal at a first light transceiver, transmitting the light signal to a second light transceiver, receiving the light signal at the second light transceiver, and decoding the data from the light signal at the second light transceiver, wherein one light transceiver is attached to a rotating component of a system and the other light transceiver is attached to a nonrotating component of the system.

The system may be a rotor system for an aircraft, and the rotating component may be a hub or yoke assembly. The electronic signal may be received from a device on an aircraft rotor. The method may further comprise establishing a session between the rotor device and an aircraft system and exchanging session data between the rotor device and the aircraft system using light communication via the first and second light transceivers.

The light signals may be transmitted between the first light transceiver and the second light transceiver through a mast in an aircraft rotor system. Alternatively, the first light transceiver and the second light transceiver may be offset from an axis of rotation of the rotating component, and the light signals may be received at the second light transceiver during less than all of the rotation of the rotating component.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
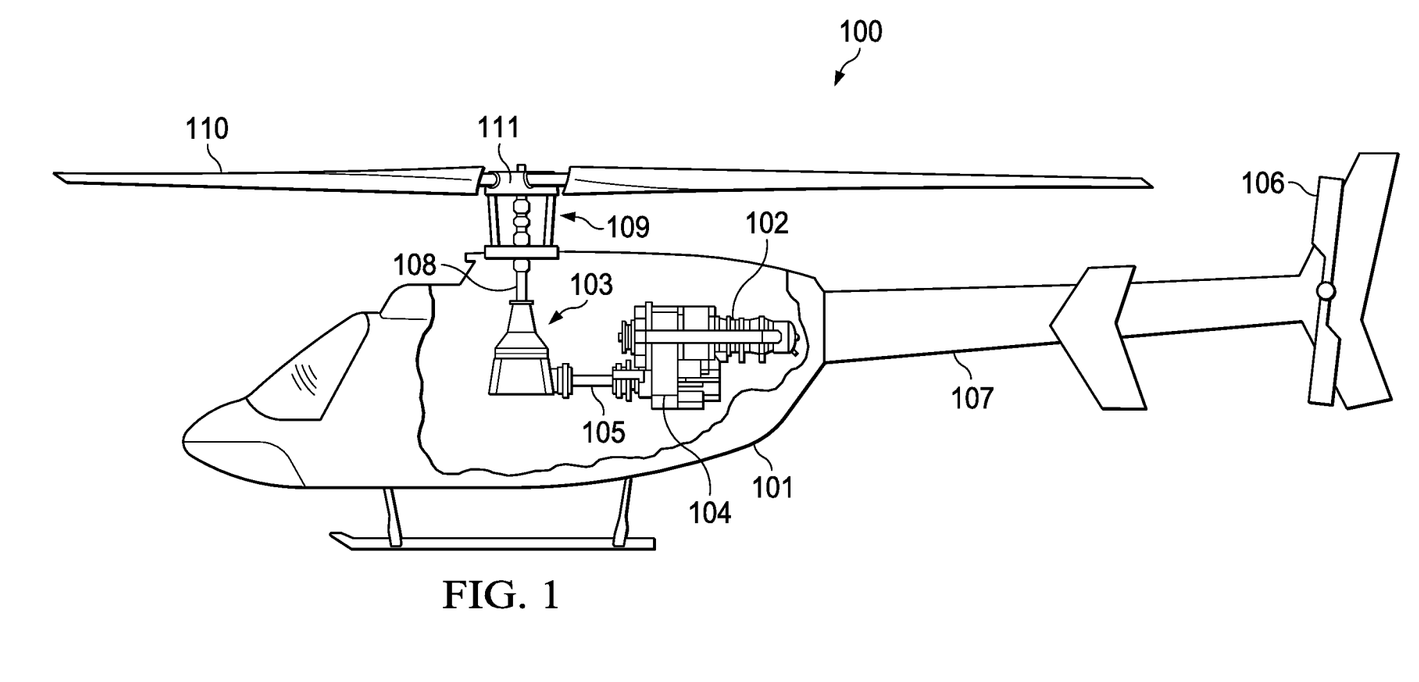
FIG. 1 illustrates a helicopter capable of employing embodiments of the disclosed light communication system.

FIG. 1. illustrates a helicopter 100 comprising a fuselage 101, an engine 102, a main rotor gearbox (MRGB) 103 that is mechanically coupled to the engine 102 through a reduction gearbox 104. Reduction gearbox 104 has a drive-shaft 105 powering MRGB 103. A tail rotor 106 functions as an anti-torque system mounted on tail member 107. Reduction gearbox 104 has attachment points for the engine accessories, such a starter-generator, a fuel pump, tachometers, etc. A mast 108 mechanically couples MRGB 103 to rotor system 109. The rotor system 109 comprises rotor blades 110 that are coupled to mast 108 via a hub 111. Engine 102 supplies torque to main rotor mast 108 via MRGB 103 to rotate main rotor blades 110. Engine 102 also supplies torque to a tail rotor drive shaft to rotate tail rotor 106.

Rotor blades 110 provide lift to enable flight for helicopter 100. The rotor blades 110 are controlled by multiple controllers within fuselage 101. The pitch of each rotor blade 110 can be manipulated to selectively control direction, thrust, and lift of the helicopter 100. For example, during flight a pilot can manipulate a cyclic controller to change the pitch angle of rotor blades 110 and/or manipulate pedals to provide vertical, horizontal, and yaw flight movement. Further, the pitch of tail rotor 106 blades can be selectively controlled to selectively control yaw of helicopter 100.

MRGB 103 functions to convert high speed rotation of output drive shaft 105 of engine 102 into lower speed rotation of main rotor mast 108. MRGB 103 will typically include one or more planetary gear sets. The planetary gear set may include a central sun gear, an outer ring gear, and a plurality of planet gears rotatably coupled to a planetary carrier and configured to "orbit" the sun gear while engaging both the sun gear and the ring gear. Typically, the sun gear receives a torque input, such as from drive-shaft 105, to the planetary gear set, and the planetary carrier provides a torque output, such to rotor mast 108, from the planetary gear set.

Figure 2:
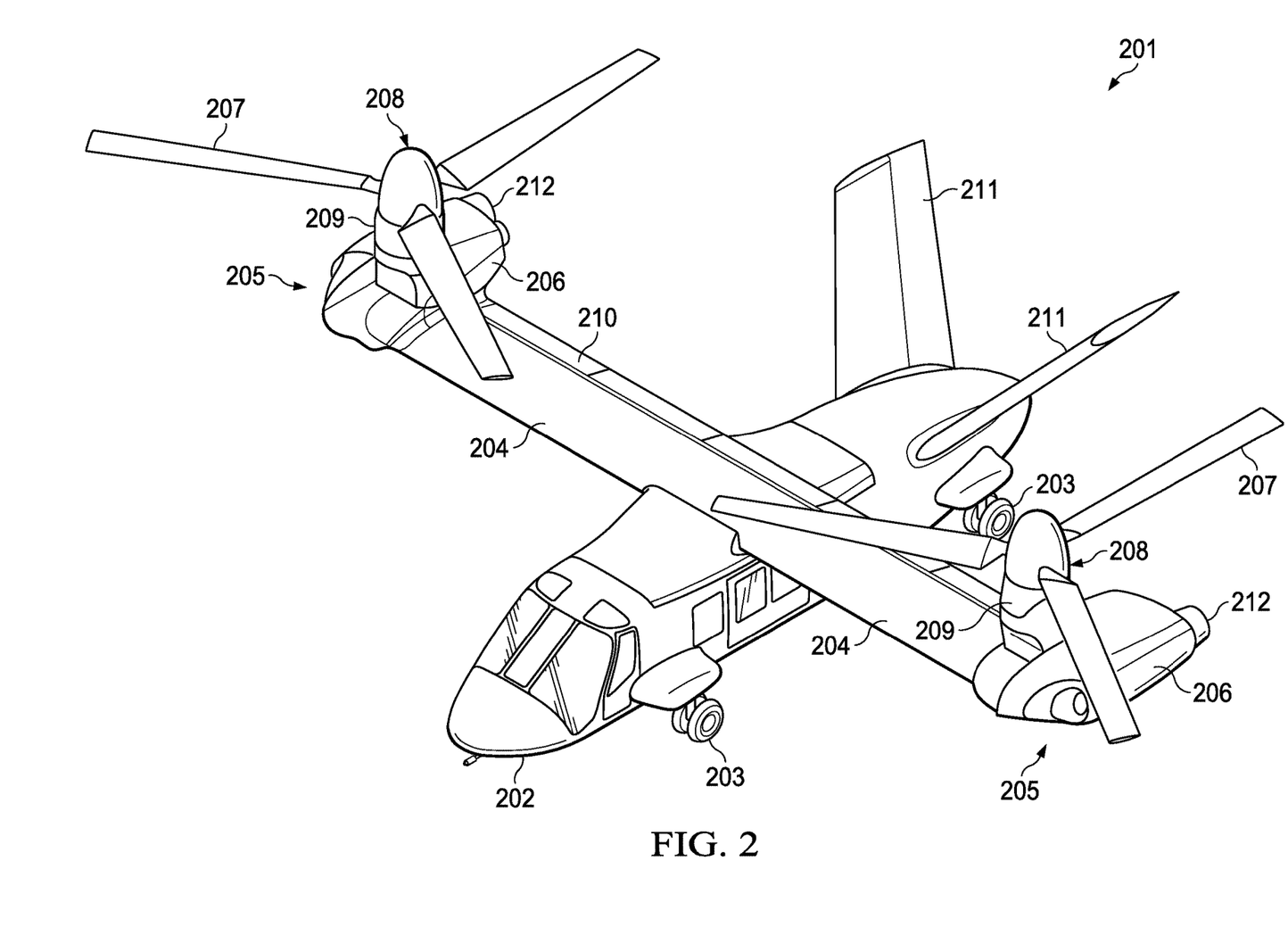
FIG. 2 illustrates a tiltrotor aircraft capable of employing embodiments of the disclosed light communication system.

FIG. 2 illustrates a tiltrotor aircraft 201 that includes fuselage 202, landing gear 203, and wings 204. A propulsion system 205 is positioned on the ends of wings 204. Each propulsion system 205 includes an engine 206 and a proprotor 208 with a plurality of rotor blades 207. During operation, engines 206 typically maintain a constant rotational speed for their respective proprotors 207. The pitch of rotor blades 207 can be adjusted to selectively control thrust and lift of each propulsion system 205 on tiltrotor aircraft 201. The tiltrotor aircraft 201 includes controls, e.g., cyclic controllers and pedals, carried within a cockpit of fuselage 202, for causing movement of the aircraft 201 and for selectively controlling the pitch of each blade 207 to control the direction, thrust, and lift of tiltrotor aircraft 201. For example, during flight a pilot can manipulate a cyclic controller to change the pitch angle of rotor blades 207 and/or manipulate pedals to provide vertical, horizontal, and yaw flight movement.

Propulsion system 205 includes a pylon 209 that is configured to rotate proprotors 208 between an airplane mode and a helicopter mode. FIG. 2 illustrates a tiltrotor aircraft 201 in a helicopter mode wherein proprotors 207 are in a substantially vertical position to provide a lifting thrust. When operating in airplane mode, proprotors 207 are rotated forward to a substantially horizontal position. The airfoil profile of wings 204 provides vertical lift in airplane mode, and rotor blades 207 provide forward thrust. Tiltrotor aircraft 201 may also be operated such that proprotors 208 are selectively positioned between airplane mode and helicopter mode, which can be referred to as a conversion mode. Control surfaces 210 on wing 204 are used to adjust the attitude of tiltrotor aircraft 201 around the pitch, roll, and yaw axes while in airplane or conversion mode. Additional stabilizers or control surfaces 211 may be required when tiltrotor aircraft 201 is in airplane or conversion mode. Control surfaces 210 and 211 may be, for example, ailerons, flaps, slats, spoilers, elevators, rudders, or ruddervators.

Propulsion system 205 for a tiltrotor aircraft 201 typically features a power train having a mast, hub, swashplate, and pitch links within pylon 209. The mast and hub are mechanical components for transmitting torque and/or rotation from the engine 206 to the rotor blades 207. The power train may include a variety of components, including a transmission and differentials. In operation, the mast receives torque or rotational energy from engine 206 and rotates the hub, which causes blades 207 to rotate. A swashplate translates flight control input into motion of blades 207. Rotor blades 207 are usually spinning when tiltrotor aircraft 201 is in flight, and the swashplate transmits flight control input from the non-rotating fuselage 202 to the hub, blades 207, and/or components coupling the hub to blades 207 (e.g., grips and pitch horns).

FIG. 2 shows a propulsion system 205 in which engine 206 remains in a fixed position while proprotor 208, rotor blades 207, and pylon 209 rotate between the helicopter, conversion, and airplane modes. The exhaust gases from engine 206 are expelled through exhaust nozzle or tailpipe 212 in a rearward direction in all aircraft configurations. In other embodiments, the entire propulsion system 205, including engine 206, may rotate relative to wing 204. In such an embodiment, the exhaust nozzle 212 would also rotate with engine 206 so that exhaust gases are expelled in a rearward direction during aircraft mode, downward in helicopter mode, and in both directions during conversion mode.

Figure 3:
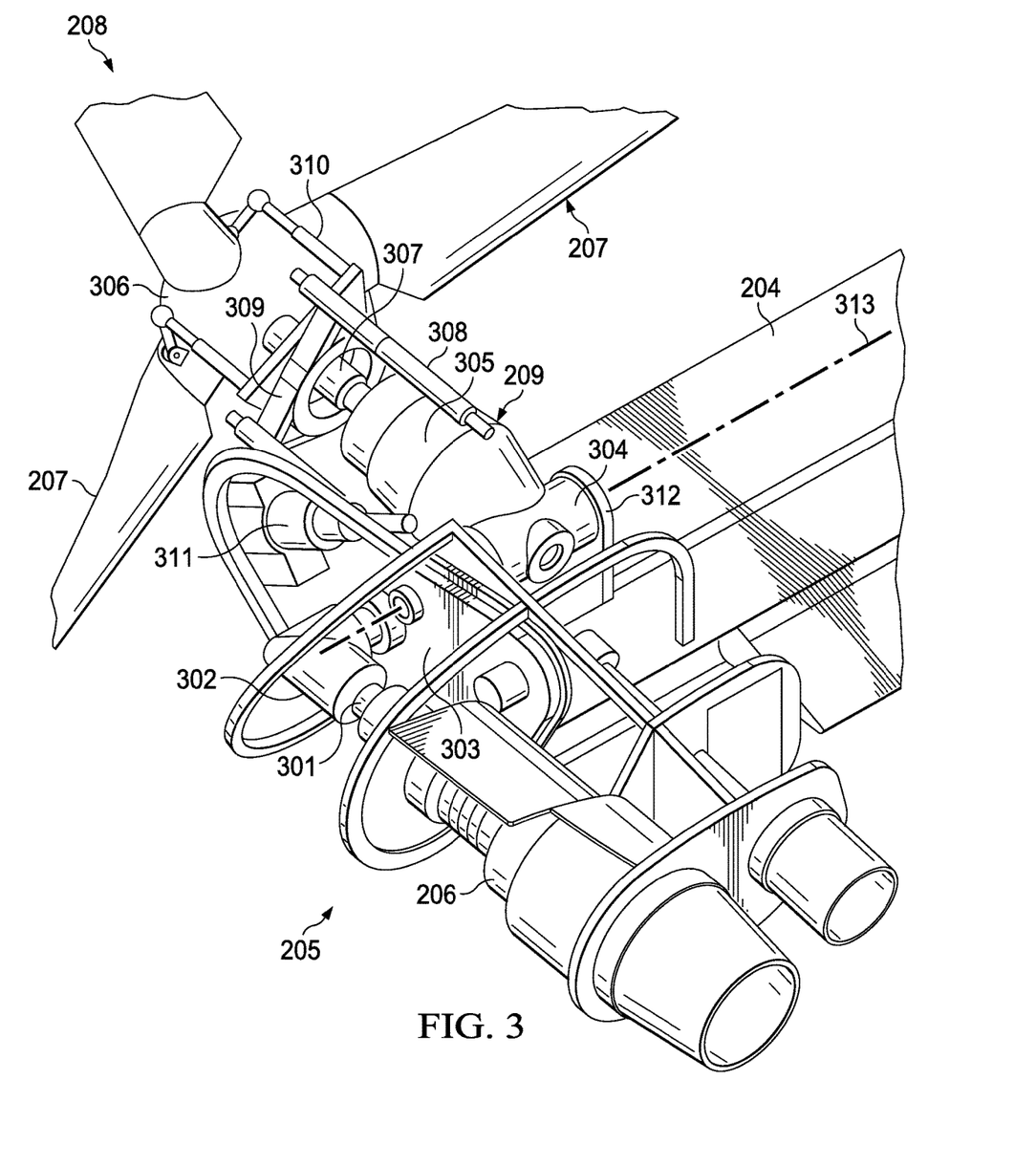
FIG. 3 illustrates details of a propulsion system capable of employing embodiments of the disclosed light communication system.

FIG. 3 illustrates further detail of propulsion system 205, which includes engine 206 that is fixed relative to wing 204 as shown in FIG. 2. An engine output shaft 301 transfers power from engine 206 to a spiral bevel gearbox 302 that includes spiral bevel gears to change torque direction by 90 degrees from engine 206 to a fixed gearbox 303. Fixed gearbox 303 includes a plurality of gears, such as helical gears, in a gear train that are coupled to a spindle gearbox 304 of proprotor gearbox 305. The gear train provides a torque path that enables engine 206 to provide torque to proprotor 208.

Proprotor 208 includes a plurality of rotor blades 207 coupled to a yoke 306 that is coupled to a mast 307. Mast 307 is coupled to proprotor gearbox 305. The collective and/or cyclic pitch of rotor blades 207 may be controlled responsive to pilot input via actuators 308, swashplate 309, and pitch links 310. During operation, a conversion actuator 311 can be actuated so as to selectively rotate proprotor gearbox 305 and thus pylon assembly 209, which in turn selectively positions proprotor 208 between helicopter mode and airplane mode. In the illustrated embodiment, spindle gearbox 304 is rotatably coupled to the airframe of tiltrotor aircraft 201 by mounting spindle gearbox 304 to an inboard pedestal depicted as inboard pillow block 312, which allows for rotation around conversion axis 313. Such rotation allows proprotor 208 to move between helicopter mode and airplane mode. The operational loads, such as thrust loads, are transmitted through mast 307 and into spindle gearbox 304 of proprotor gearbox 305. Proprotor gearbox 305 is configured to transfer power and reduce speed to mast 307. Speed reduction is accomplished by a planetary gear assembly. Thus, spindle gearbox 304 is structurally supported and is operable to be rotated about a conversion axis by conversion actuator 311.

In many embodiments, there are parameters to be monitored and systems to be controlled in rotor system 109 of helicopter 101 (FIG. 1) and in proprotor 208 of tiltrotor aircraft 201. For example, aircrew may desire to monitor parameters such as ice detection, mast torque, rotor blade flapping, rotor position, rotor RPM, rotor vibration, and/or rotor strain. Additionally, aircrew may desire to control rotor deicing, anti-icing, damping, and/or other systems that rotate during operation. Slip rings are used in prior rotorcraft to provide an interface between the rotating and non-rotating equipment. However, due to the demanding operating conditions in which they need to perform, slip rings require frequent maintenance and are prone to failure due to wear and corrosion. In some embodiments, slip rings in rotating structures may be replaced with light communication (LC) to provide data and/or power connections between the rotating and non-rotating equipment.

Figure 4:
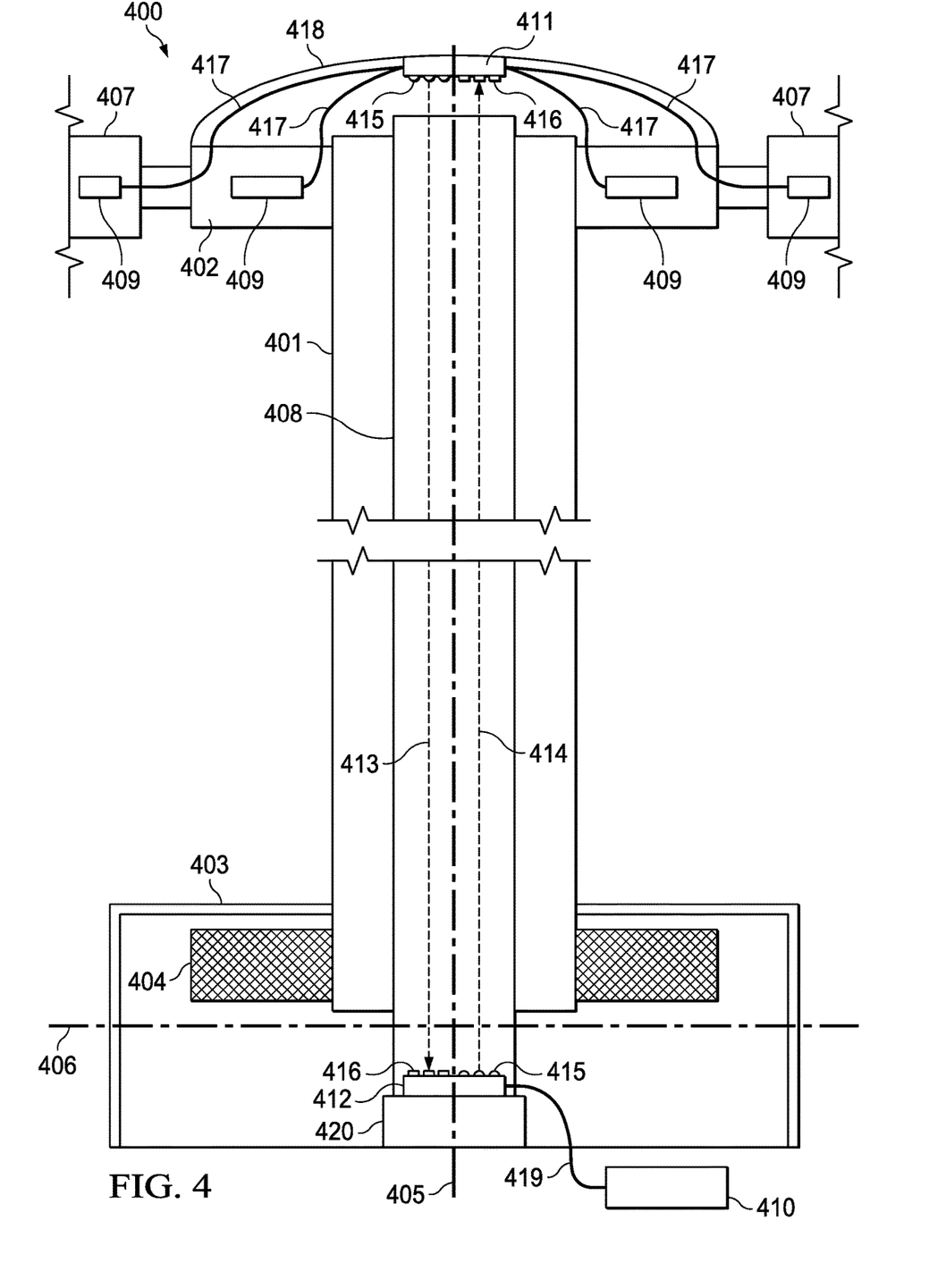
FIG. 4 is a block diagram of a rotor system that incorporates a light communication slip ring according to an example embodiment.

FIG. 4 is a block diagram of a rotor system 400 that incorporates a light communication slip ring according to an example embodiment. Mast 401 couples hub and yoke assembly 402 to gearbox 403. Mast 401 is attached to and driven by gearing 404, which may be a planetary carrier, for example. Additional gears (not shown) transfer torque from an engine to gearing 404, which causes mast 401 to rotate around axis 405. Gearbox 403 does not rotate relative to mast 401, but rotation of mast 401 drives rotation of hub and yoke assembly 402. In some embodiments, gearbox 403 may rotate about a conversion axis 406, such as to move between a vertical, helicopter mode and a horizontal, airplane mode. During such rotation about conversion axis 406, the relationship among gearbox 403, mast 401, and hub and yoke assembly 402 remains the same—i.e., gearbox 403 is fixed relative to mast 401 and hub and yoke assembly 402. Hub and yoke assembly 402 is attached to two or more rotor blades 407 that rotate with hub and yoke assembly 402 and mast 401.

Mast 401 is a hollow cylindrical structure. Standpipe 408 is also a hollow cylindrical structure and is positioned coaxially inside mast 401 along axis of rotation 405. Standpipe 408 is mounted on a bracket 420 in gearbox, which holds standpipe 408 in a fixed position while mast 401 rotates around it. In other embodiments, standpipe 408 may pass out of the bottom of gearbox 403 and may be mounted on other aircraft equipment.

A number of electronic components 409 are mounted on hub and yoke assembly 402 and/or rotor blades 407. These components 409 may be, for example, passive sensors (e.g., ice detection sensors) or active systems (e.g., anti-icing and/or deicing systems). Components 409 are monitored by and/or controlled by system 410, which may be mounted in an aircraft cockpit, avionics compartment, or other fuselage are that does not rotate with hub and yoke assembly 402 and/or rotor blades 407. Accordingly, a direct wired connection is not possible between components 409 and system 410 since the rotation of hub and yoke assembly 402 and/or rotor blades 407 would twist and break any such connection.

In FIG. 4, an LC system is used to provide a communication path between components 409 and system 410. LC transceivers or access points 411 and 412 are in communication with each other via light signals 413 and 414. LC access points 411 and 412 have light transmitters 415 and light receivers 416 that allow the LC access points 411 and 412 to establish one or more communication channels between them.

Light transmitter 415 may be an LED or laser, for example. Light transmitter 116 may use invisible (e.g., infrared) and/or visible light spectrum for high speed data communication. Data can be sent using LC by encoding data bits with a transmitter/encoder into a signal that drives light transmitter 415, which then broadcasts the information as light signals 413 and 414. The total size of the infrared and visible light spectrum is approximately 2600 times the size of the entire radio frequency spectrum. LEDs have been shown to enable data rates up to 5 Gbps with peak transmission speeds of 8 Gbps using with a single LED. Data rates higher than 100 Gbps are feasible with laser-based lighting. Accordingly, LC can vastly extend the available bandwidth for wireless communication devices. Communication protocols available for LC may be referred to as Light Fidelity (LiFi) or Optical Wireless Communication (OWC) and may be defined in IEEE 802.11bb, IEEE 802.15.7m, 802.15.13, or other standards.

Light receiver 416 may be, for example, a camera, image sensor, or photodetector, such as a Complementary Metal Oxide Semiconductor (CMOS) sensor or other electronic chip that converts photons to electrons for digital processing. Light receiver 115 detects light and generates an electronic signal for a receiver/decoder that extracts data bits that are carried by the light signals 413 and 414. The extracted bits may carry information that can be used by processors in the receiving equipment. Any information that can be exchanged over traditional RF data channels can also be exchanged over LC channels, such as digital bit streams, packet data, voice, video, text, or other content. Although the example wireless communication devices 411 and 412 depict a system having both transmit and receive capabilities for light communications, it will be understood that in other embodiments an LC access point may have only LC transmit components (i.e., light transmitter 415) or only LC receive components (i.e., light sensor 416). Such single-direction LC systems may be used, for example, when the wireless communication device only needs to transmit or only needs to receive data via an LC channel.

The light transmitter 415 and light receiver 416 on the same LC access point 411 or 412 may operate in the same or different frequency bands. For example, both may operate in a visible light band or an infrared light band, or one component may operate in a visible light band while the other component operates in the infrared light band. Sub frequencies of the visible light bands and infrared light bands may also be identified and assigned to different components to avoid interference and improve security. To manage use of the LC system, specific frequencies or frequency bands within the visible and invisible light spectrum may be defined as channels. The channels may be assigned for use with specific components 409, systems 410, or functions. Different channels may be further designated for use to transmit data or to transmit power. For example, LC access point 412 and/or components 409 may be powered using light transmitted from LC access point 412, which may then be distributed by LC access point 412 to components 409 on network 417.

Information collected by sensors 409 is transmitted to LC access point 411 via network 417. LC access point 411 is held in a position generally centered above standpipe 408 by a bracket or rotor head cover 418. An encoder circuit in LC access point 411 coverts the electronic signals from sensors 409 to light signals 413 that are broadcast by light transmitters 415. LC access point 412 is mounted generally centered at the base of standpipe 408. Light receivers 416 in LC access point 412 receive light signals 413. A decoder circuit in LC access point 412 converts the received light signals 413 to electronic signals that are sent to system 410 on network 419.

Similarly, control signals from system 410 are transmitted to LC access point 412 via network 419. An encoder circuit in LC access point 412 coverts the electronic signals from system 410 to light signals 414 that are broadcast by light transmitters 415. Light receivers 416 in LC access point 411 receive light signals 414. A decoder circuit in LC access point 411 converts the received light signals 414 to electronic signals that are sent to sensors 409 on network 417.

In an alternative embodiment, instead of communicating over a physical network 417 and/or 419, sensors 409 and system 410 may use wireless radio frequency (RF) communications, such as Wi-Fi, Bluetooth, Near Field Communications Link, etc. to communicate with their respective LC access point 411 or 412.

When mast 401 and rotor system 400 are rotating, LC access point 411 is also rotating, but LC access point 412 remains in a fixed position relative to such rotation. The pattern of light transmitters 415 and light receivers 416 on LC access points 411 and 412 may be selected to ensure that light signals 413 and 414 are received without regard to a relative rotation of LC access points 411 and 412. For example, each individual light transmitter 415, or selected group of light transmitters 415, on one LC access point may be designed to create a coverage area or attocell that overlaps the opposite LC access point. This would ensure that the light receivers 416 on the opposite LC access point always are in a position to receive light signals without regard to a current rotation angle.

It should be appreciated that the embodiments disclosed in the present application may be used on aircraft other than helicopters and tiltrotor aircraft, such as airplanes, drones, and unmanned aircraft. Moreover, the disclosed embodiments are not limited to aircraft applications, but can be used with any application that requires power and/or electrical signals to be transmitted from a stationary to a rotating structure, such as wind turbines, cranes, or other equipment.

Although FIG. 4 depicts a rotor system having a standpipe 408 within mast 401, it will be understood that in other embodiment, the light communication system can be used without a standpipe 408. For example, LC access points 411 and 412 may be in communication with each other by transmitting light signals within mast 401.

Figure 5:
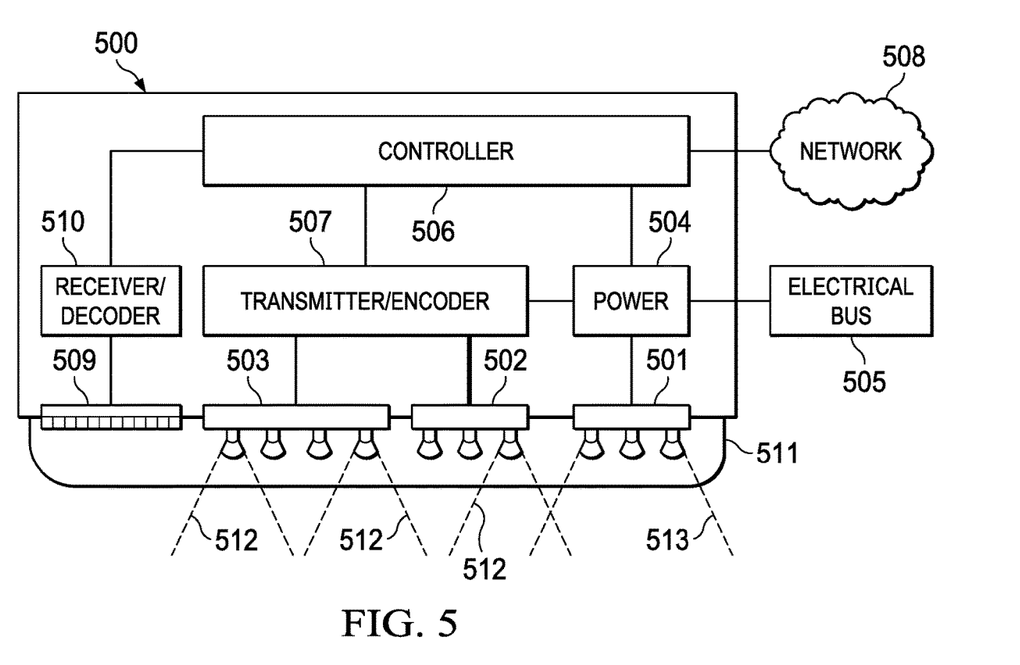
FIG. 5 depicts a light communication access point for use in a rotating system.

FIG. 5 depicts a light communication access point 500 for use in a rotating system, such as in an aircraft rotor system. One or more sets of one or more lights 501, 502, and 503 are used to transmit data and/or power. For example, lights 501 may provide visible or invisible light for use in powering LC-capable devices, such as a remote access point or other components. Additional sets of one or more lights 502 and 503 are adapted for transmitting data using visible or invisible light communications. Power supply 504 receives power from an aircraft electrical bus 505, such as an avionics bus or accessory bus. Power supply 504 may alternatively receive power via light signals from a remote transmitter instead of from an electrical bus 505.

Power supply 504 provides electricity to power lights 501, which may be LEDs or laser lights, that transmit power wirelessly to other devices. Controller 506 may manage when such wireless power is available and at what frequencies. Power lights 501 may transmit power over the same frequency or groups of one or more lights 501 may transmit power on different visible and/or invisible frequencies.

Power supply 504 also provides power for data lights 502 and 503. Data is transmitted using LC by encoding data bits using transmitter/encoder 507 into a signal that drives data lights 502 and 503, which then broadcast the information as light signals. Data lights may be LEDs or laser lights, for example. Data lights 502 and 503 may transmit data over the same frequency or groups of one or more lights 502 and 503 may transmit data on different frequencies. Controller 506 is coupled to a data network 508 that carries information, such as digital bit streams, packet data, voice, video, text, or other content. Network 508 may be coupled to an aircraft network (e.g. 419) and/or to a sensor or other equipment network (e.g. 417). Controller 506 receives information to be broadcast and sends the information to transmitter/encoder 507, which encodes the information as digital signals that are transmitted by data lights 502 and 503 in the visible and/or invisible spectrum.

A light sensor 509 detects visible and/or invisible light and generates an electronic signal for receiver/decoder 510, which extracts data bits that are carried by the light. The extracted bits may carry information that can be processed by controller 506 and forwarded to data network 508. Light sensor 509 may be, for example, a camera, image sensor, or photodetector, such as a CMOS sensor or other electronic chip that converts photons to electrons for digital processing.

LC access point 500 may include a clear or opaque cover 511 to protect lights 501-503. Each set of lights 501-503 and each individual bulb or LED therein may be configured to broadcast in a particular emission spectrum and pattern. The pattern may define a particular coverage region or attocell 512 or 513. The coverage regions 512 and 513 may or may not overlap and may have different sizes, such as narrow attocells 512 or wide attocells 513.

In other embodiments only LC transmit components (i.e., transmitter/encoder 507 and light transmitters 502 and 503) or only LC receive components (i.e., light sensor 509 and receiver/decoder 510) are provided in LC access point 500. Such single-direction LC systems may be used, for example, when a remote LC communication device only needs to transmit or only needs to receive data via an LC channel.

Figure 6:
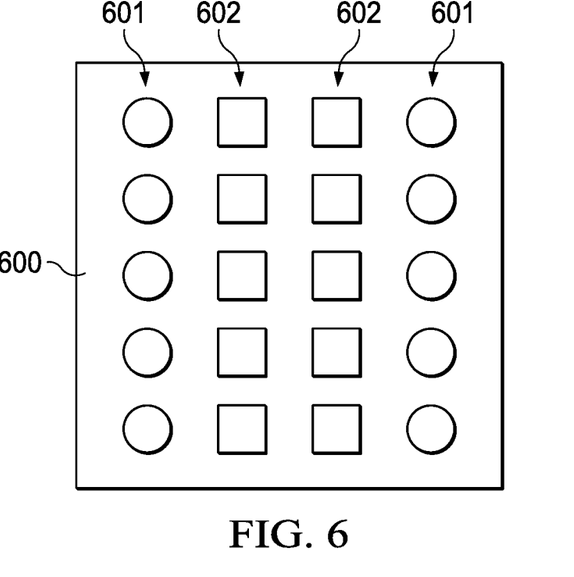
FIG. 6 is a block diagram of an example light communication sensor array having light transmitters and light receivers arranged in columns.

FIG. 6 is a block diagram of an example light communication sensor array 600 having light transmitters 601 and light receivers 602 arranged in columns. Light communication sensor array 600 may be used with a pair of LC access points, such as LC access points 411 and 412 (FIG. 4), in which one access point is fixed and the other access point is rotating.

Figure 7:
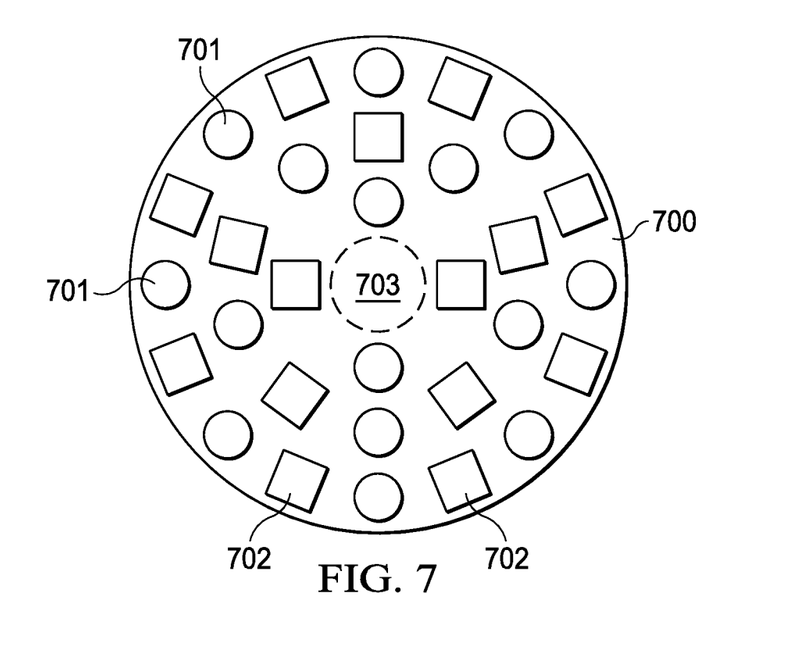
FIG. 7 is a block diagram of another example light communication sensor array having light transmitters and light receivers distributed across a circular pattern.

FIG. 7 is a block diagram of another example light communication sensor array 700 having light transmitters 701 (circles) and light receivers 702 (squares) distributed across a circular pattern. Light communication sensor array 700 may be used with a pair of LC access points, such as LC access points 411 and 412, in which one access point is fixed and the other access point is rotating.

Figure 8:
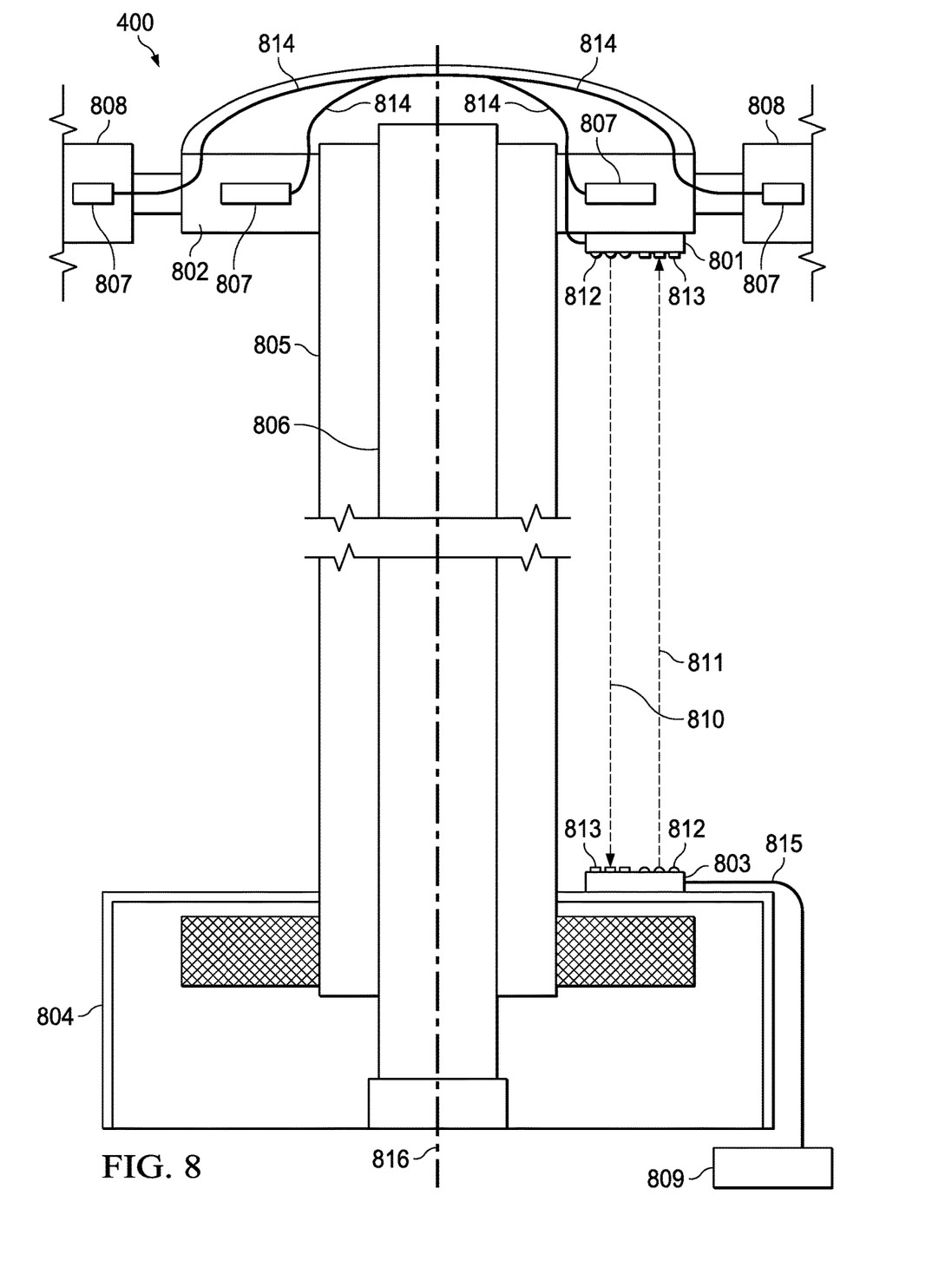
FIG. 8 is a block diagram of a rotor system that incorporates a light communication slip ring according to an alternative embodiment.

FIG. 8 is a block diagram of a rotor system 800 that incorporates a light communication slip ring according to an alternative embodiment. In FIG. 8, LC transceiver or access point 801 is mounted on the bottom of hub and yoke assembly 802, and LC transceiver or access point 803 is mounted on top of gearbox 804. Rotor system 800 comprises a mast 805 that couples hub and yoke assembly 802 to gearbox 804. Mast 805 may or may not include a central standpipe 806. Hub and yoke assembly 802 and mast 805 are configured to rotate around axis 816. For example, rotation of mast 805 may be driven by torque generated in gearbox 804, which then causes hub and yoke assembly 802 to rotate.

A number of electronic components 807 are mounted on hub and yoke assembly 802 and/or rotor blades 808. These components 807 may be, for example, passive sensors (e.g., ice detection sensors) or active systems (e.g., anti-icing and/or deicing systems). Components 807 are monitored by and/or controlled by system 809, which may be mounted in an aircraft cockpit, avionics compartment, or other fuselage are that does not rotate with hub and yoke assembly 802 and/or rotor blades 807. Accordingly, a direct wired connection is not possible between components 807 and system 809 since the rotation of hub and yoke assembly 802 and/or rotor blades 807 would twist and break any such connection.

An LC system is used to provide a communication path between components 807 and system 809. LC access points 801 and 803 are in communication with each other via light signals 810 and 811. LC access points 801 and 803 have light transmitters 812 and light receivers 813 as described herein that allow the LC access points 801 and 803 to establish one or more communication channels between them. LC access point 801 rotates with hub and yoke assembly 802 and, therefore, is aligned above LC access point 802 once per revolution. LC access points 801 and 803 may exchange data using light signals 810 and 811 during such periods of alignment. The data rate on light signals 810 and 811 may be adjusted to compensate for the interment alignment of LC access points 801 and 803.

Information collected by sensors 807 is transmitted to LC access point 801 via network 814. An encoder circuit in LC access point 801 coverts the electronic signals from sensors 807 to light signals 810 that are broadcast by light transmitters 812. Light receivers 813 in LC access point 803 receive light signals 810. A decoder circuit in LC access point 803 converts the received light signals 810 to electronic signals that are sent to system 809 on network 815.

Similarly, control signals from system 809 are transmitted to LC access point 803 via network 815. An encoder circuit in LC access point 803 coverts the electronic signals from system 809 to light signals 811 that are broadcast by light transmitters 812. Light receivers 813 in LC access point 801 receive light signals 811. A decoder circuit in LC access point 803 converts the received light signals 811 to electronic signals that are sent to sensors 807 on network 814.

In other embodiments of rotor system 800, the light transmitters 812 may be selected to have a broad coverage area so that light signals 810 and 811 cover a wider area to increase the time that light receivers 813 are able to receive signals during each rotation. In further embodiments, light transmitters 812 and/or light receivers 813 for at least one of LC access points 801 and 803 may be distributed around mast 805 so that light signals may be transmitted and/or received during an entire revolution of hub and yoke assembly 802. For example, light communication sensor array 700 (FIG. 7) may have a mast opening 703. This would allow array 700 to be mounted on top of gearbox 804 and/or under hub and yoke assembly 802 for use with LC access points 801 and/or 803.

Figure 9:
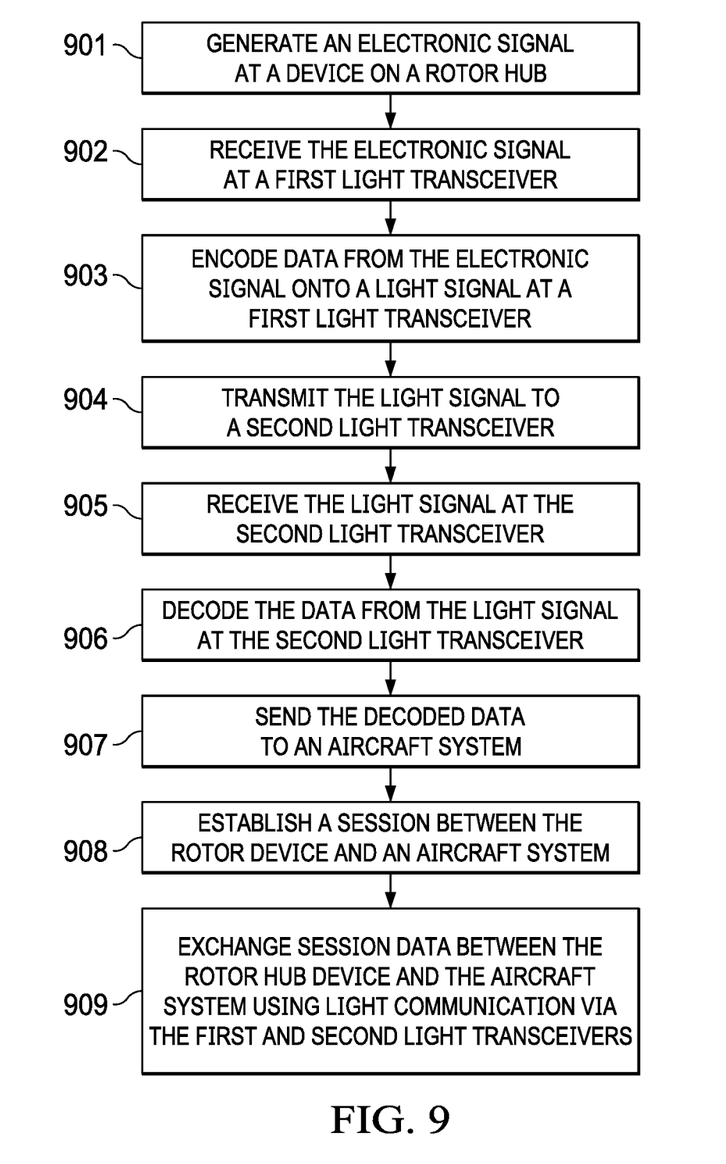
FIG. 9 is a flowchart illustrating a method according to an example embodiment.

FIG. 9 is a flowchart illustrating a method according to an example embodiment. One light transceiver is attached to a rotating component of a system, and another light transceiver is attached to a nonrotating component of the system. For example, the system may be a rotor system for an aircraft, and the rotating component is a hub or yoke assembly. In step 901, a device on a rotor hub generates an electronic signal. In step 902, the electronic signal is received at a first light transceiver. In step 903, data from the electronic signal is encoded onto a light signal at a first light transceiver. In step 904, the light signal is transmitted to a second light transceiver.

In step 905, the light signal is received at the second light transceiver. In step 906, the data from the light signal is decoded at the second light transceiver. In step 907, the decoded data is sent to an aircraft system.

In step 908, a session is established between the rotor device and an aircraft system. In step 909, session data is exchanged between the rotor device and the aircraft system using light communication via the first and second light transceivers. The session data may include, for example, control signals sent to the device on the rotor hub and measurement data from the device on rotor hub. Referring to the example embodiment in FIG. 4, a session may be established between electronic components 409 mounted on hub and yoke assembly 402 and/or rotor blades 407 and a monitoring/control system 410. The session may be a series of interactions between end points 409 and 410 that occur during a single connection. The end points may take turns exchanging commands and data in an interactive information interchange, or the session may last long enough just to send data or commands in one direction. The session data may be transported over networks 417 and 419 and light channels 413 and 414. The session data may be carried in a series of one or more data packets formatted according to a standard or proprietary protocol.

In one embodiment, as illustrated in FIG. 4, light signals may be transmitted between a first light transceiver and a second light transceiver through (i.e., inside) a mast in an aircraft rotor system. In another embodiment, as illustrated in FIG. 8, the first light transceiver and the second light transceiver may be offset from an axis of rotation of the rotating component and/or the light transmissions may occur in an unenclosed space. In this configuration, the light signal may be received at the second light transceiver during less than all of the rotation of the rotating component, such as when light transceiver 801 is positioned above or in line with light transceiver 803.

An example embodiment comprises a system for providing light communication in an apparatus having a rotating component. A first light communication access point is attached to, and configured to rotate with, the rotating component. A second light communication access point is attached to a fixed component. The second light communication access point is configured to remain stationary relative to rotation of the first light communication access point. The first and second light communication access points are configured to exchange light signals during rotation of the rotating component.

The rotating component may be an aircraft rotor system, and the fixed component may be a gearbox structure.

The system may further comprise a mast having a first end and a second end, and having a hollow center portion extending between the first end and the second end. The first light communication access point may be positioned near the first end of the mast, the second light communication access point may be positioned near the second end of the mast, and the light signals can then be transmitted through the hollow center portion of the mast.

The system may further comprise a mast having a hollow center portion, and a standpipe positioned coaxially within the hollow center portion of the mast. The standpipe may have a first end and a second end, and a hollow center portion extending between the first end and the second end. The first light communication access point may be positioned adjacent the first end of the standpipe, the second light communication access point may be positioned adjacent the second end of the standpipe, and the light signals can then be transmitted through the hollow center portion of the standpipe. The mast is attached to and drives the rotating component, and the standpipe may be attached to the fixed component or the rotating component.

The first and second light communication access points may each comprise a light transmitter configured to transmit light signals, and a light receiver configured to receive light signals. The light transmitter may be a Light Emitting Diode (LED). The light transmitter may further comprise an encoder that encodes data on the light signals. The light receiver may be a photodetector. The light receiver may further comprise a decoder that extracts data from the light signals. Light communication may be established using a visible light spectrum, an invisible light spectrum, or both.

Another example embodiment comprises a rotor system for an aircraft. A gearbox is configured to receive torque from a drive train. A mast has a first end and a second end. The first end is attached to the gearbox, and the mast is configured to rotate in response to the torque from the drive train. A rotor hub is attached to the second end of the mast. A first light transceiver is mounted adjacent to the first end of the mast. The first light transceiver does not rotate relative to the mast. A second light transceiver is mounted adjacent to the second end of the mast and rotates with the mast.

The first and second light transceivers may each comprise a light transmitter configured to transmit light signals and a light receiver configured to receive light signals. The first and second light transceivers may be configured to exchange light signals carrying encoded data. The first light transceivers may be configured to transmit a light power signal, and the second light transceiver may be configured to receive the light power signal. The second light transceiver may be further configured to convert the light power signals to electrical energy for use in powering electrical components mounted on the rotor hub.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A system for providing light communication in an apparatus having an aircraft rotor, comprising:
 a first light communication access point attached to, and configured to rotate with, the aircraft rotor;
 a second light communication access point attached to a gearbox structure, wherein the second light communication access point is configured to remain stationary relative to rotation of the first light communication access point; and wherein the first and second light communication access points are configured to exchange light signals during rotation of the aircraft rotor.

2. The system of claim 1, further comprising:
a mast having a first end and a second end, and having a hollow center portion extending between the first end and the second end; and
wherein the first light communication access point is positioned near the first end of the mast, the second light communication access point is positioned near the second end of the mast, and the light signals are transmitted through the hollow center portion of the mast.

3. The system of claim 1, further comprising:
a mast having a hollow center portion;
a standpipe positioned coaxially within the hollow center portion of the mast, the standpipe having a first end and a second end, and having a hollow center portion extending between the first end and the second end; and
wherein the first light communication access point is positioned adjacent the first end of the standpipe, the second light communication access point is positioned adjacent the second end of the standpipe, and the light signals are transmitted through the hollow center portion of the standpipe.

4. The system of claim 3, wherein the mast is attached to and drives the aircraft rotor, and wherein the standpipe is attached to the gearbox structure.

5. The system of claim 1, wherein the first and second light communication access points each comprise:
a light transmitter configured to transmit light signals; and
a light receiver configured to receive light signals.

6. The system of claim 5, wherein the light transmitter is a Light Emitting Diode (LED).

7. The system of claim 6, wherein the light transmitter further comprises an encoder that encodes data on the light signals.

8. The system of claim 5, wherein the light receiver is a photodetector.

9. The system of claim 8, wherein the light receiver further comprises a decoder that extracts data from the light signals.

10. The system of claim 1, wherein light communication is established using a visible light spectrum, an invisible light spectrum, or both.

11. A rotor system for an aircraft, comprising:
a gearbox configured to receive torque from a drive train;
a mast having a first end and a second end, the first end attached to the gearbox, and the mast configured to rotate in response to the torque from the drive train;
a rotor hub attached to the second end of the mast;
a first light transceiver mounted adjacent to the first end of the mast, wherein the first light transceiver does not rotate relative to the mast; and
a second light transceiver mounted adjacent to the second end of the mast, wherein the second light transceiver rotates with the mast.

12. The rotor system of claim 11, wherein the first and second light transceivers each comprise:
a light transmitter configured to transmit light signals; and
a light receiver configured to receive light signals.

13. The rotor system of claim 12, wherein the first and second light transceivers are configured to exchange light signals carrying encoded data.

14. The rotor system of claim 11, wherein the first light transceivers is configured to transmit a light power signal, and the second light transceiver is configured to receive the light power signal, the second light transceiver is further configured to convert the light power signals to electrical energy for use in powering electrical components mounted on the rotor hub.

15. A method, comprising:
receiving an electronic signal at a first light transceiver;
encoding data from the electronic signal onto a light signal at the first light transceiver;
transmitting the light signal to a second light transceiver;
receiving the light signal at the second light transceiver; and
decoding the data from the light signal at the second light transceiver, wherein one light transceiver is attached to a hub or yoke assembly of a rotor system for an aircraft and the other light transceiver is attached to a nonrotating component of the rotor system for the aircraft.

16. The method of claim 15, the electronic signal is received from a device on an aircraft rotor hub, the method further comprising:
establishing a session between the hub or yoke assembly and the aircraft; and
exchanging session data between the hub or yoke assembly and the aircraft system using light communication via the first and second light transceivers.

17. The method of claim 15, wherein the light signals are transmitted between the first light transceiver and the second light transceiver through a mast in the aircraft rotor system.

18. The method of claim 15, wherein the first light transceiver and the second light transceiver are offset from an axis of rotation of the hub or yoke assembly, and wherein the light signals are received at the second light transceiver during less than all of the rotation of the hub or yoke assembly.

* * * * *